United States Patent [19]

Hastings et al.

[11] 4,080,572
[45] Mar. 21, 1978

[54] RECEIVER AND METHOD FOR SYNCHRONIZING AND DETECTING CODED WAVEFORMS

[75] Inventors: Charles M. Hastings, Cape St. Claire; Steven J. Clancy, Elkridge; Daniel J. Lincoln, Bowie, all of Md.

[73] Assignee: Westinghouse Electric Corporation, Pittsburgh, Pa.

[21] Appl. No.: 744,545

[22] Filed: Nov. 24, 1976

[51] Int. Cl.² ............................................. H04B 1/10
[52] U.S. Cl. .................................. 325/321; 325/323; 328/115
[58] Field of Search ............... 325/321, 323, 324, 325, 325/42, 65, 477; 328/115, 116, 118, 119, 162, 165; 329/104, 109; 178/69.1

[56] References Cited

U.S. PATENT DOCUMENTS

| | | | |
|---|---|---|---|
| 3,633,108 | 1/1972 | Kneuer | 325/323 |
| 3,678,396 | 7/1972 | Hoffman | 325/324 |
| 3,736,511 | 5/1973 | Gibson | 325/321 |
| 3,777,268 | 12/1975 | Cleobury | 325/323 |
| 3,936,740 | 2/1976 | Hogg | 328/115 |
| 3,991,376 | 11/1976 | Stevens | 328/115 |

Primary Examiner—Robert L. Griffin
Assistant Examiner—Michael A. Masinick
Attorney, Agent, or Firm—H. W. Patterson

[57] ABSTRACT

A receiver and method for detecting a Manchester coded waveform is disclosed. The waveform is clocked to provide a number of digital samples of each positive and negative pulse. Each positive pulse is validated provided that a predetermined number ($k$) of the total samples ($N$) is more positive than a positive ($+T$) threshold level and a predetermined consecutive number ($j$) of the samples ($N$) are more positive than a negative ($-T$) threshold level. Each negative pulse is validated provided that ($k$) of ($N$) samples is more negative than the $-T$ threshold level and ($j$) of ($N$) are more negative than the $+T$ threshold level. Each data bit pulse synchronizes each succeeding data bit pulse by providing a predetermined time interval during which the midpoint of each pulse must change between a positive and negative waveform.

10 Claims, 10 Drawing Figures

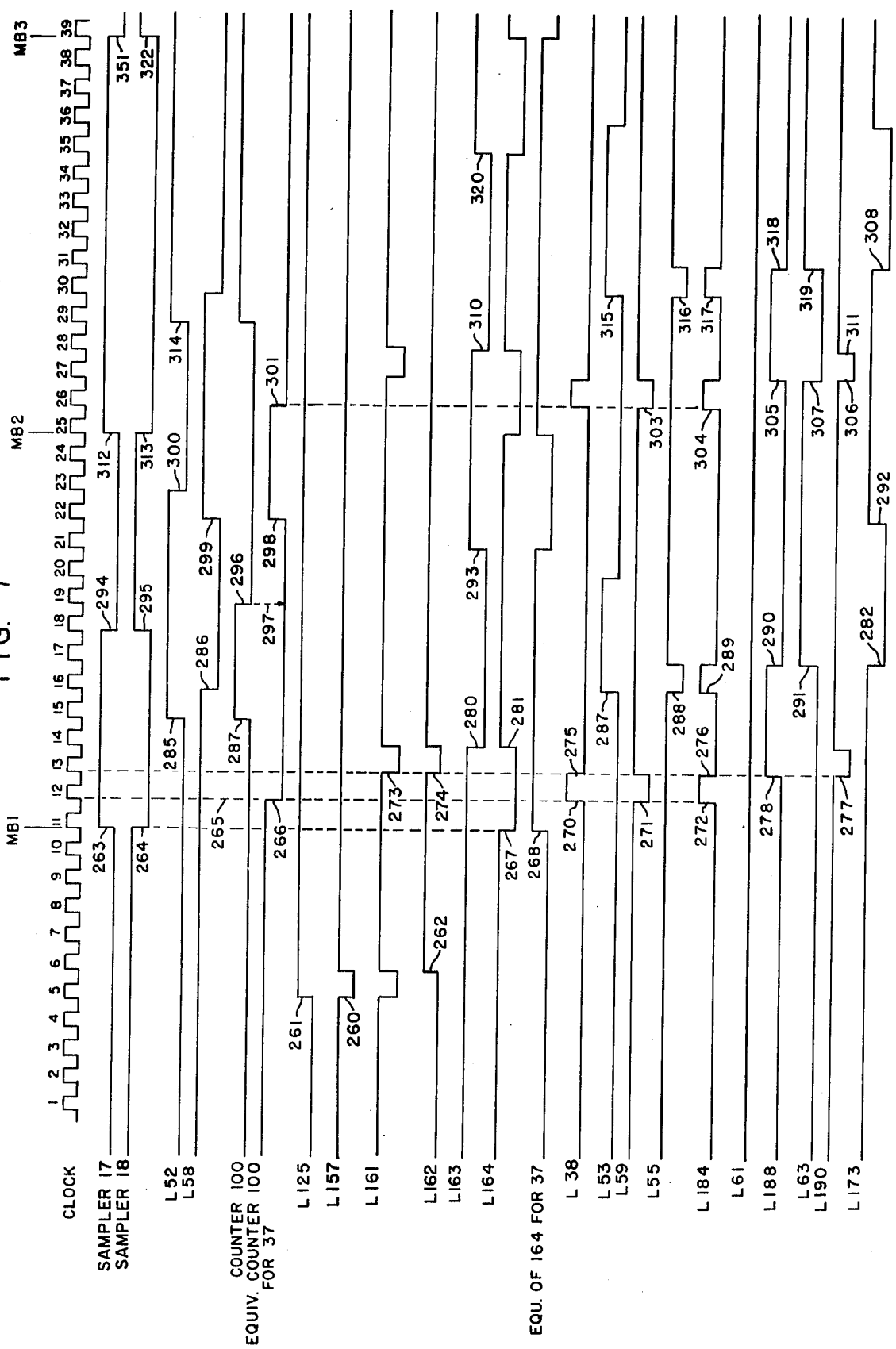

RECEIVER AND METHOD FOR SYNCHRONIZING AND DETECTING CODED WAVEFORMS

The invention herein described was made in the course of or under a contract or subcontract thereunder with the Department of the Air Force.

BACKGROUND OF THE INVENTION

1. Field of the Invention

The present invention relates to data detectors, and more particularly to receivers for synchronizing and detecting the transmission of data between digital systems or subsystems.

2. Description of the Prior Art

In the transmission of digital data over a communication channel, a coded waveform is utilized that synchronizes and validates each data word. A synchronizing waveform, which detects the beginning of each data word, is followed by a series of data waveforms, each of which detects the identity of a data bit of such word. These coded waveforms are detected by a receiver that validates the synchronizing and data waveforms.

The coded waveforms utilized are typically a series of bipolar pulses, the polarity of which differs in accordance with the data bit identity. Such bipolar waveforms may be of different shapes, such as sawtooth, square, or sinewave, for example. The synchronizing waveform, of course, must be different than the data waveforms. A coded waveform that offers definite advantages in the transmission of data is the well known Manchester coded waveform that is a bi-phase-level data waveform that immediately follows a synchronizing waveform. For the data bit waveforms, the state of the signal during the first 180° phase of each bit period corresponds to the logic state being transmitted. For example, if the data signal is "high" during the first 180°, a logical "one" is being transmitted. If the data signal is "low" during the first 180°, a logical "zero" is being transmitted. Thus, if "$f$" is the frequency of transmission, a pattern of all "one's" or a pattern of "zero's" represents a frequency of "$f$". A pattern of alternate "one's" and "zero's" represents a frequency of one-half "$f$". The synchronization waveform is a duration of three bits, resulting in a frequency of one-third "$f$". No allowable combination of bit waveforms can produce the synchronization waveform; thus, it is readily distinguishable. In a valid data portion of a Manchester code, there is always a zero crossover at each odd multiple of 180°; but, there may or may not be a zero crossover at even multiples of 180°. For example, if the first data bit is a "zero", then the first or odd 180° goes from low to high, crossing through zero voltage. If the next data bit is "zero", the even or second 180° goes from low to high, again crossing through zero voltage. But, if the next or second data bit is a "one" the even or second 180° stays high, and does not go through zero until the beginning of the third data bit. Stated another way, there is always a transition of the waveform through zero voltage at the mid-position of each bit, but not necessarily at the end of each bit.

Difficulty arises when the coded waveforms must be received over a noisy transmission channel, which obscures the identity and location of the synchronizing and data bit codes rendering reception inaccurate.

Heretofore, noise accommodation was attempted by several methods and devices. One example is the use of a matched filter, which provides significant noise improvement. This filter is matched to a preferred waveform to be detected in the sense that the response to a unit impulse is equal to the said preferred waveform reversed in time. However, the output of such matched filter does not resemble the input waveform. For example, square waves are converted into sawtooth waveforms; and the signal-to-noise ratio is the greatest at the peak of the waveform. Thus, the data detection must be accomplished in the area of the peak. This requires the precise location of such peak; and increases the problem of synchronous time location.

Further, the use of a general analog filter has certain advantages in that it passes relevant portions of the coded waveform and overcomes the location problem attendant with the use of the matched filter. However, the bandwidth of the analog filter had to be such that the signal-to-noise ratio improvement factor was only in the neighborhood of 3 to 5 decibels, for example. This signal-to-noise ratio is substantially inferior to the matched filter technique.

Another prior art method and apparatus for noise improvement, particularly in radar systems, is to utilize what is termed "coincidence detection" or sometimes referred to as "majority logic". In this method, the clocking waveform of a much higher frequency than the coded waveform is utilized to detect the plurality of samples of each positive and negative portion of the waveform; that is, during each code pulse, a plurality of samples N of the waveform is detected. If a predetermined number $k$ is above a certain threshold in the case of the positive waveforms, or below a certain threshold in the case of the negative waveform, the synchronous and data pulses are deemed to be valid. This coincidence detection improves the signal-to-noise ratio effectively which improves the receiver's ability to detect that a valid signal is present. However, the problem of where the signal begins and ends is still present. This is because the $k$ out of the N samples could have occurred during any portion of the coded waveform bit; that is, the beginning, the center, or the end. Still another technique utilized in such receivers is the detection of consecutive samples above a threshold for the positive waveform and the detection of consecutive samples below a threshold for the negative waveform. With this arrangement, it is possible to determine accurately the location of the signal. However, such signal is detected as invalid if a single noise spike should occur and destroy such consecutive detection. In order to reduce the probability of such occurrence, selected samples of the waveform are detected. For example, the second sample and the fifth sample, for data bits that are clocked six times, are selected. This detects the mid-position of the first half and the mid-position of the second half of the data bit. For a "one", the second sample must be detected above a predetermined positive threshold and the fifth sample must be detected below a predetermined negative threshold. For a "zero" the second sample must be detected below the negative threshold and the fifth sample must be detected above the positive threshold to validate the bit. If a noise spike occurs during such second or fifth sample, the bit is destroyed. Although this consecutive and selective sampling precisely located the signal, such technique did not provide an adequate noise margin.

Therefore, it is desirable to provide an improved system and method of detecting synchronous and data pulses in a coded waveform, which provides a substantial improvement in accommodating transmission line noise over the systems and methods presently known, while at the same time providing for a precise location of the signals.

SUMMARY OF THE INVENTION

Broadly, the present invention relates to a system and method for detecting coded waveforms having a combination of pulses of high and low levels of predetermined duration in accordance with data being transmitted. Each transmitted waveform is sampled a total predetermined number of times N. Validation of each pulse occurs when a predetermined portion ($k$) of the samples (N) exceed a first threshold energy level and a consecutive number ($j$) of samples (N) are less than a second threshold level.

In another aspect for the data portion of the waveform, each preceding bit waveform is synchronized with each succeeding bit waveform by providing a predetermined time interval during which each waveform must change between its high and low level characteristics.

More specifically, the present invention relates to such a system and method where the coded waveform voltage is bipolar; and to validate the waveform requires for the positive pulse the detection of $k$ of N samples to be more positive than a predetermined positive threshold level together with $j$ consecutive of N samples to be more positive than a predetermined negative threshold level, for the negative pulse; and the detection of $k$ of N samples to be more negative than a predetermined negative threshold level together with the detection of $j$ consecutive of N pulses to be more negative than a predetermined positive threshold level. In other aspects, such a system and method provides for resynchronizing the detection data from bit to bit; and also provides for utilizing predetermined mid-bit indication for each data bit to occur within a predetermined time duration to improve synchronization noise immunity.

BRIEF DESCRIPTION OF THE DRAWINGS

In the drawings:

FIG. 7 is a timing diagram of the operation of the data bit position of the system.

DESCRIPTION OF THE PREFERRED EMBODIMENT

Figure 1:
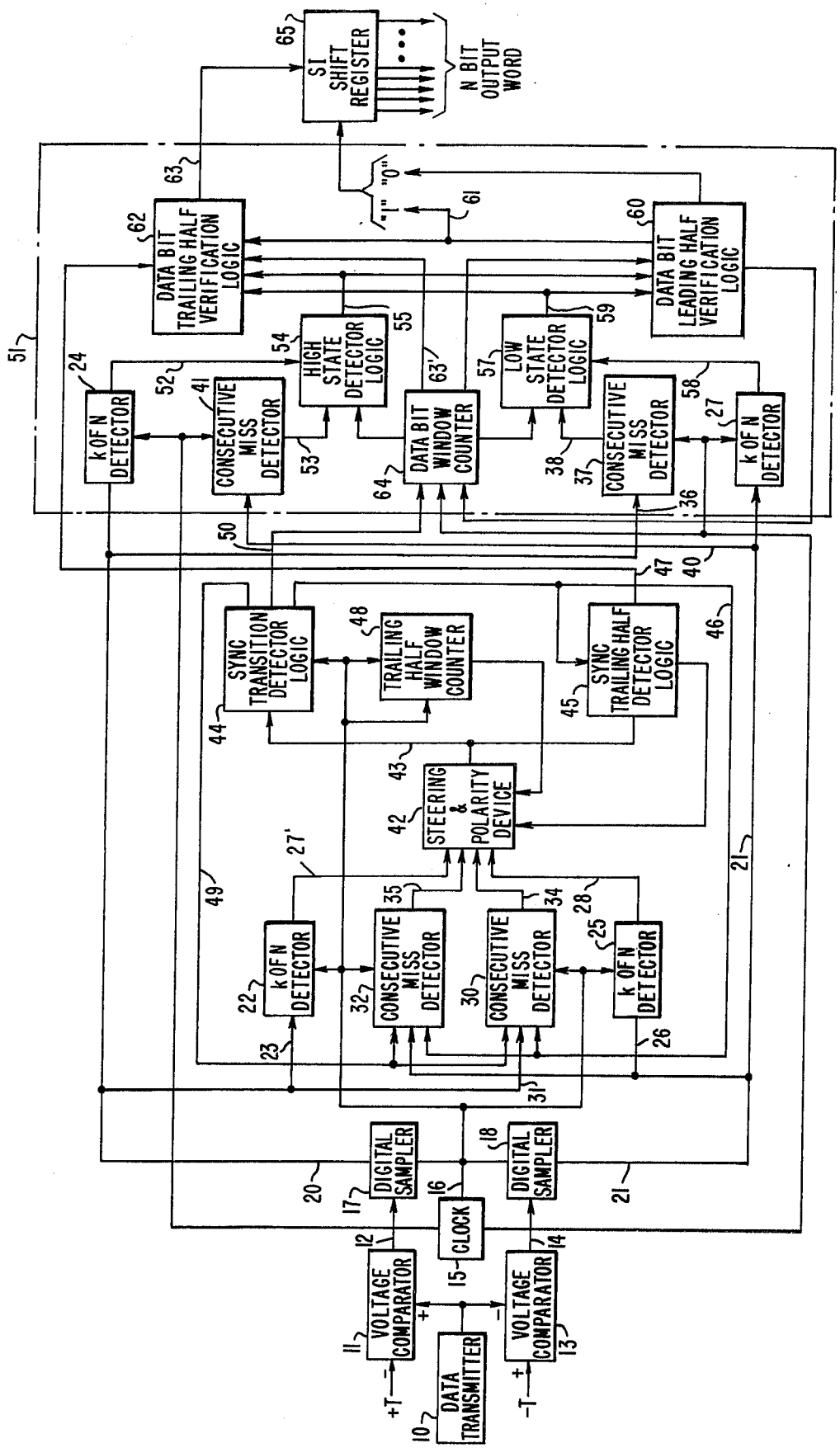
FIG. 1 is a schematic block diagram of a receiver constructed in accordance with one embodiment of the present invention.
Figure 4:
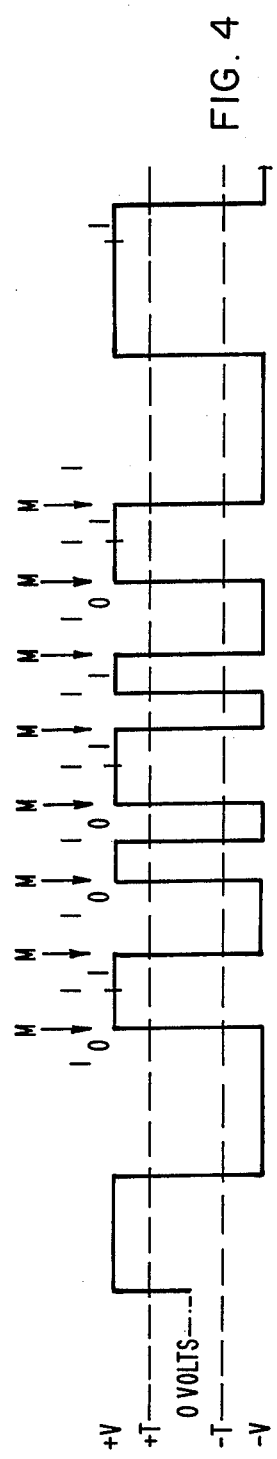
FIG. 4 illustrates a portion of a typical Manchester coded waveform.
Figure 5:
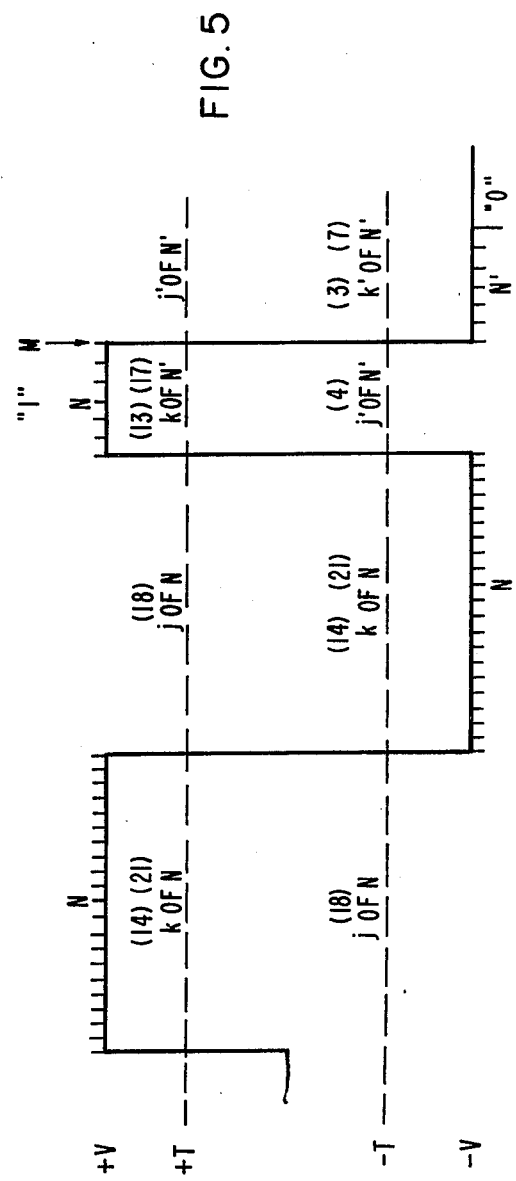
FIG. 5 is an enlarged view showing the synchronization waveform followed by a data bit to illustrate the clocked pulses according to one example.

Referring to FIG. 1 which is described in conjunction with FIGS. 4 and 5 for a clearer understanding of the present embodiment, a data transmitter referred to at 10 in FIG. 1 transmits the coded waveform as shown in FIG. 4. It is understood, of course, that the data portion of the waveform may include any combination of "zero" and "one" and be for any number of bits, depending upon the particular installation. The present embodiment illustrates a system and method for a 16-bit data word that is preceded by a synchronization waveform. Also in the present embodiment, it is assumed that each synchronization waveform, such as shown in FIG. 4 is of 3 microsecond duration with the serial data bit pulses being 1 microsecond in duration. A voltage comparator 11 provides an output on line 12 as long as such voltage is more positive than a threshold level referred to as $+T$ (also see FIGS. 4 and 5). A voltage comparator 13 provides an output on line 14 for the duration of any voltage that is sensed to be more negative than a threshold $-T$ (see FIGS. 4 and 5). A clock 15 generates pulses at a frequency of 14 megahertz, for example, which are input on line 16 to digital samplers 17 and 18. In the described embodiment of the invention, clock pulses at a frequency of 14 megahertz will sample each half of the synchronization waveform 21 times; and each half of the data waveforms 7 times. As shown in FIG. 5, N refers to the total number of clocked samples for each pulse and the required ($k$) samples and ($j$) consecutive samples required for each validation. The digital sampler 17, which may be a conventional D flip-flop circuit, provides an output for every positive clock pulse edge. The digital sampler changes state or remains in its present state, depending on the input from the voltage comparator 11. Thus, the sampler 17 provides an output on line 20 in response to each pulse of the clock 15 at times when the voltage comparator 11 detects that the incoming pulse is above a predetermined positive threshold. Similarly, the digital sampler 18 provides an output on line 21 for each clock pulse when the output of the voltage comparator 13 is more negative than a predetermined threshold.

The output of the sampler 17 is input to a detector 22 over line 23; and input to a detector 24 over the line 20. The digital sampler 18 is connected at its output to a detector 25 over line 26 and to a detector 27 over the line 21. The detectors 22 and 25 count the number of digital samples from the samplers 17 and 18, respectively, which exceed the respective threshold limits $+T$ and $-T$ as previously mentioned. In the present embodiment of the invention, if the detector 22 detects fourteen out of the previous 21 samples, an output occurs on line 27. These fourteen detected samples do not have to be consecutive, but can be any 14 out of the previous 21 clock pulses. Thus, if the digital sampler 17 detects any 14 clock pulses out of the previous 21 that are more positive than the threshold level $+T$, an output occurs on the line 27. Similarly, the detector 25 provides an output on line 28 in response to any 14 pulses from the digital sampler 18 that are more negative than the threshold level $-T$. The detectors 24 and 27 each detect that at least three of the previous seven pulses on line 20 are more positive than the threshold $+T$, and more negative than the theshold $-T$, respectively. It is understood that the number of pulses that are detected to be beyond the threshold levels may be more or less than those described for this embodiment of the invention; that is, for detecting the synchronous pulses, more or less than 14 can be detected as being beyond the threshold levels and for the data pulses more or less than two can be detected as being beyond the threshold levels.

The digital sampler 17 is also connected at its output to a consecutive miss detector 30 over line 31. The digital sampler 18 is connected to a consecutive miss detector 32 over line 33. The consecutive miss detector 30 provides an output on line 34 when a predetermined number $j'$, such as 18, for example, are detected as being less negative than the threshold $-T$. The detector 32 provides a distinctive output on line 35 when a predetermined number $j'$, such as eighteen, for example, from the digital sampler 18 are detected as being less positive than the threshold level $-T$. The digital sampler 17 which samples the pulses above the threshold $+T$ is also connected over lines 20 and 36 to a consecutive miss detector 37 which provides a distinctive output on line 38 whenever a predetermined number $j'$, such as four, for example, are above or less negative than the threshold $-T$. The digital sampler 18 is connected over line 21 and line 40 to a consecutive miss detector 41 which detects a predetermined number of consecutive pulses as being less positive than the threshold level $+T$. The detectors 22, 25, 30, and 32 are utilized to detect the validity of a synchronization waveform; and the detectors 24, 27, 37, and 41 are utilized to detect a data waveform.

To summarize the description of the schematic diagram of FIG. 1 thus far, the input waveforms from the data transmitter 10 are compared against a $+T$ voltage threshold at 11 and against a $-T$ voltage threshold at 13. The results of these comparisons are sampled with respective digital sampling devices 17 and 18. These sampled signals are then examined with $k$ of N floating window detectors 22 and 25, respectively. The floating window nomenclature refers to the fact that the last N samples are examined at any point in time. When the sampled positive threshold data from the digital sampler 17 is being examined by the detector 22 for at least $k$ samples above the $+T$ threshold in the last N samples, negative threshold data is being simultaneously examined by the miss detector 32 for $j$ consecutive samples above the threshold of $-T$ volts or, equivalently $j$ consecutive samples of missed threshold crossings from the sampler 18. When the consecutive miss criterion is present and the $k$ of N criterion is present from devices 32 and 22, respectively, an output occurs on lines 27 and 35. Similarly, when the sampled threshold data from the sampler 18 is being examined by the floating window detector 25 for at least $k$ samples more negative than the $-T$ threshold in the last N samples, positive threshold data from the digital sampler 17 is simultaneously examined for $j$ consecutive samples below the threshold of $+T$ volts or, equivalently $j$ consecutive samples of missed threshold crossings from the sampler 17. When both the $k$ of N and the $j$ consecutive criteria are present, a distinctive output occurs simultaneously on lines 28 and 34.

A steering and polarity device 42, the input of which includes the previously mentioned outputs 27, 35, 34, and 28, is to determine that both criteria exist simultaneously and determines which polarity should be present. In the event that the initial or first half of the synchronous waveform is being transmitted, the polarity and steering device 42 is indifferent as to whether such first half is positive or negative, but the second half of the synchronous waveform must be determined to be of opposite polarity in order to provide a valid synchronization waveform detection. The steering device 42 has an output 43 which is connected to a synchronizing waveform transition detector logic device 44 and a synchronizing waveform second or trailing half detector logic device 45. In response to the completion of the leading or first half of the synchronization waveform, a distinctive output occurs on line 46 which detects that the leading half has been indicated to be valid and that the second half must be of opposite polarity in order to complete a valid synchronization waveform detected by the trailing half detector logic 45. Assuming that all criteria have been met, at the end of a complete synchronous waveform a distinctive output occurs on line 47 from the trailing half detector logic 45. A trailing half window counter 48 counts an effective 21 clock pulses to determine whether or not the second half of the synchronization waveform has established the $k$ of N and $j$ consecutive detections within the proper time period. In the event that it has met all criteria, the synchronous valid output occurs on line 47 as previously described; but, if such criteria has not been met, further transmission is inhibited by an output which occurs on line 49. The synchronization waveform validation outputs on the lines 47 and 50 enable subsequent data bit detection by that portion of the system within the dashed lines referred to at 51. As previously mentioned, the floating window detectors 24 and 27 and the consecutive miss detectors 37 and 41 respond to the digital samplers 17 and 18 in an analogous manner to the detectors 22, 32, 30, and 25 for synchronization waveform detection, except that the detectors 24 and 27 detect three out of any previous seven sampled pulses above the $+t$ threshold level and below the $-t$ threshold level respectively. Also, the consecutive miss detectors 37 and 41 operate to provide an output upon the missing of four consecutive clocked pulses above and below the previously described thresholds, respectively.

Inputs 52 and 53 to high state detector logic 54 provide a distinctive output on line 55 when the criteria $k$ of N and $j$ consecutive of detectors 24 and 41 are met. Similarly, a low state detector logic 57 has the input 38 and an input 58 to provide a distinctive output on line 59 when the criteria of both detectors 27 and 37 are met. Because both "zero" and "one" data bit waveforms are possible at the end of the synchronization waveform, a data bit leading half detector logic device 60 receives an input on lines 55 and 59 to monitor the results of the high state detector logic 54 and the low state detector logic 57. If the waveform is for a data "one" bit, the detectors 24 and 41 detect respectively that at least $k'$ of the last N' samples exceeded $+T$ volts and $k'$ consecutive samples were more positive than $-T$ volts. When the waveform switches polarity, the $j'$ consecutive criterion of detector 41 generates another distinctive output and the high state detector logic 54 and the data bit leading half detector logic 60 combine to generate a distinctive output on line 61 and a distinctive output on line 62 to indicate that a mid-bit transition marker has occurred. The detectors 27 and 37 respectively detect that at least $k'$ of the last N' samples are more negative than $-T$ volts and that $j'$ consecutive samples are less negative than $-T$ volts. When these criteria are met simultaneously, the low state detector logic 57 and the data bit trailing half verification logic referred to at 62 produce a "data valid" indication on line 63. If the waveform is for a data "zero" bit, similar processes occur with detectors 27 and 37, the low state detector logic 57 and the data bit leading half detector logic 60 detecting a leading half low state. The detectors 24, 41, 54 and 62 validate a trailing half "high" state.

A data bit window counter 64 has an input 50 from the synchronization transition detector logic 44 and an input 62 from the data bit leading half detector logic 60 to provide time windows to steer and control the detection processes. The synchronous marker signal from the synchronous transition detector logic 44 initiates timing for each serial word. The counter 64 issues data bit window signals to the high state detector logic 54 and the low state detector logic 57 which bracket the first expected data time interval. The counter 64 also issues a transition window signal to the data bit leading half detector logic 60 which brackets the expected time of occurrence of waveform polarity reversal for the first data bit. If the data bit leading half detector logic 60 generates a distinctive output on the line 62, denoting a "mid-bit" within this transition window, the counter 64 issues a verification window to the data bit trailing half verification logic block 62 over a line 63, thereby enabling verification of the trailing half of the first data bit. If all required events occur within the designated windows, the processes repeat for each succeeding data bit with each distinctive output on 62 denoting a "mid-bit" acting as a synchronization marker for the following data bit. This ability to resynchronize the processes with each "mid-bit marker" signal, thus placing a transition window around the expected time of occurrence of the waveform polarity reversal, improves the noise immunity of the timing process. A shift register 65 is shown which accepts the "one" and "zero" over the line 61 at times when the data valid output line 63 has a distinctive signal.

Figure 2A:
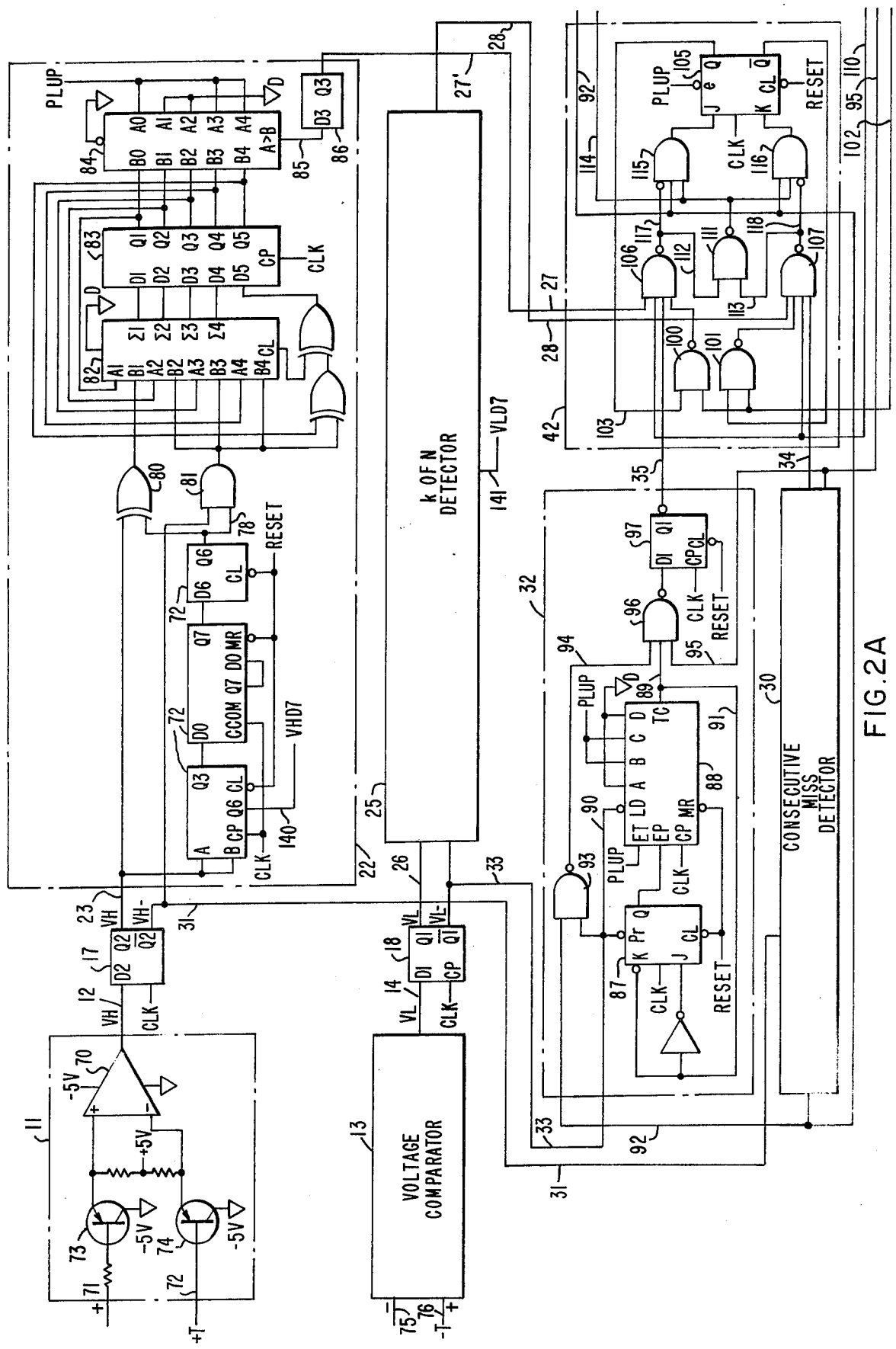
FIGS. 2A and 2B are schematic diagrams illustrating in more detail that portion of the block diagram of FIG. 1 for validating the synchronization portion of the waveform.
Figure 2B:
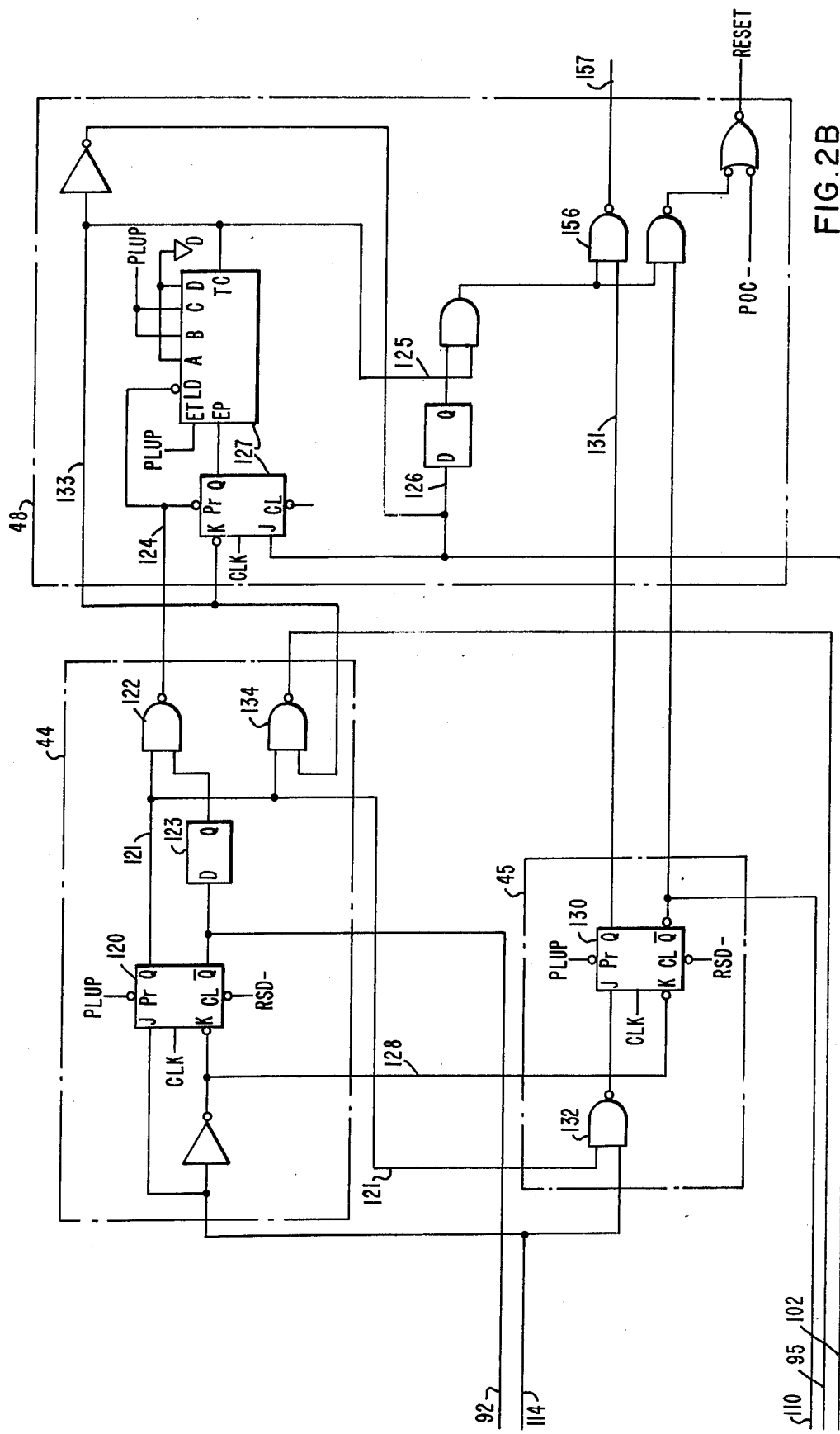

FIGS. 2A and 2B illustrate in detail that portion of the block diagram of FIG. 1 which detects the synchronization waveform. The individual blocks of FIG. 1 are illustrated within corresponding dashed lines of FIGS. 2A and 2B and bear similar reference characters. The voltage comparator 11 comprises an amplifier 70 having two inputs 71 and 72, respectively. When the positive input 71 exceeds the negative input, the output 12 of the amplifier 70 goes high. Transistors 73 and 74 are provided for input protection to the amplifier 70. The comparator 13 is similar to the comparator 11, except that it provides an output on the line 14 at times when the negative input on line 75 exceeds the positive input on line 76. The digital samplers 17 and 18 may be conventional D flip-flop circuits which are clocked at a 14 megahertz rate, for example, to produce at their respective outputs the input signal present on lines 12 and 14, respectively.

The $k$ of N detectors 22 and 25 are similarly constructed; and thus the details of the detector 22 are shown for the sake of simplicity. The detector 22 includes a conventional delay line made up of a shift register arrangement referred to at 77 which are a plurality of flip-flop circuits with the output of one driving the input of the next so that at some predetermined number of clock pulses or edges later, such as 21 clock edges for example, the digital sample appears on line 78. The present digital sample from the sampler 17 is clocked on the line 23 to the input of an exclusive OR gate 80. The delayed sample on the output of line 78 is input to an AND gate 81. The outputs of the gates 80 and 81 are input to a binary adder 82 which produces a running total of the number of samples above the +T threshold out of the previous 21 samples. Each current sample from the output of the gate 80 is added while the delayed sample is subtracted from the running total. The register 83 registers the number of samples that have exceeded the +T threshold value during the last 21 samples. The device 84 is a conventional digital comparator which generates a logic high on line 85 whenever at least 14 of the previous twenty-one samples have exceeded the threshold value. A flip-flop circuit 86 is provided to equalize the delay times to produce a high on the line 27' each time there is a successful sampling of 14 of the previous 21 clock pulses. The detector 25 is similar to the previously described detector 22, except that a high output appears on the line 28 whenever a successful sampling of negative pulses from the digital sampler 18 has occurred.

Simultaneously with the operation of the $k$ of N detectors 22 and 25, the operation of the $j$ consecutive miss detectors 30 and 32 occur. During the operation of the detector 22, as previously described, the digital sampler 18 is producing a clocked output on line 33, which during the presence of a positive synchronization waveform is indicating that the clocked pulses are less negative than the negative threshold value. The $j$ miss detector 32 includes a counting arrangement comprised of a $j$-$k$ flip-flop 87 and a counter 88. The flip-flop 87 is utilized to extend the range of the counter 88 from a four-bit to a five-bit effective counter. In response to the output line 33 of the sampler 18 indicating a high the counters 87 and 88 are enabled to count $j$ consecutive pulses above the negative threshold. When 18 consecutive pulses have been indicated to be less negative than the negative threshold, an output occurs on line 89. In the event one of the samples should be more negative than the negative threshold value during the occurrence of a positive synchronization pulse, the counter 88 is reset by way of input 90 to start the process over again. The indication on the line 89 that 18 straight consecutive samples have occurred which are less negative than the negative threshold value the counter 87, 88 is disabled over the line 91, which holds the value in the counter. During the initial counting of the synchronization waveform, in the first half of the pulse, line 92 from the transition detector 44 is high which is input to a NAND gate 93. Thus, when the counter 87, 88 is disabled as previously mentioned, and the line 92 is high, indicating that 18 consecutive misses have occurred and the system is in the first half of the synchronization waveform, a high output occurs on line 94. At this point, after the detection of 18 consecutive misses and prior to the transition point, an input 95 to NAND gate 96 is high from the output of the synchronization transition detector logic 44, hereinafter described. While the counter 87, 88 is disabled following the detection of 18 consecutive misses, a flip-flop 97 is operated which provides a high output on line 98. when the line 33 at the output of the sampler 18 goes from a high to a low, indicating that a sample is below the negative threshold, the counter is again loaded and commences its consecutive detection process. It takes a single clock pulse to load the counter so subsequent to the detection of 18 consecutive misses, the output line 89 will be high before the actual loading occurs and starts the chain over again. During this one clock period pulse, the line 98 is a high which indicates a synchronization marker or that there have been eighteen straight or consecutive misses and that they have dropped out. The consecutive miss detector 30 is similar to the consecutive miss detector 32, except that it provides a high on the line 34 in response to the detection of 18 consecutive pulses below the +T threshold value.

The line 102 connected to the output 126 of the logic circuit 48 is connected to the inputs of the gates 100 and 101 of the steering ligic 42 which establishes whether a particular polarity of the waveform is being validated, i.e., the second half. If it is the first half, then either polarity waveform may be validated.

The steering and polarity logic 42 determines that both criteria were present simultaneously and determines which polarity should occur during the next half of the synchronization waveform. NAND gates 100 and 101 of the logic 42 are each provided with a common input 102 from the trailing half window counter 48. The gate 100 has an input 103; the gate 101 has an input 104 from the output of a flip-flop circuit 105, which circuit determines that the next half of the synchronization waveform should be of opposite polarity. The input 102 insures that the transition from one polarity to the other of the synchronization waveform has not occurred. In the first half of the waveform, the gates 100 and 101 provide a high output to NAND gates 106 and 107, each provides an output for a different polarity of the synchronization waveform. The gate 106 has as its input the output 28 from the detector 25 and the output 35 from the detector 32. The gate 107 has as its input the output 27′ from the detector 22 and the output 34 from the detector 30. Both gates 106 and 107 also have an input 110 from the output of the synchronization trailing half detector 45. When all the input criteria have been met, the input criteria to a NAND gate 111 is satisfied through the absence of a high signal on inputs 112 or 113 from the gates 106 or 107, respectively, to indicate on line 114 that the criteria of k of N and j straight is good. AND gates 115 and 116 are used to operate the previously mentioned j-k flip-flop circuit 105; and have as their inputs the line 92 from the transition detector 44, to be hereinafter described. The gates 115 and 116 also have as their inputs an output 117 from the gate 106 and an output 118 from the gate 107, respectively. These gates operate such that after it has been established that the first half of the synchronization waveform has occured, the flip-flop 105 is locked out to indicate that the next half of the synchronization waveform must be of opposite polarity.

The synchronization transition detector logic 44 responds to the "one" output on the line 114 from the NAND gate 111 of the logic 42 to operate a flip-flop 120 such that the line 92 at the Q bar output of the flip-flop operates to a low level. In response to the operation of the line 114 from the logic 42 indicating that the synch pulse is good, the flip-flop circuit 120 operates so that the line 92 goes to a zero logical level for operating the flip-flop circuit 105 as previously mentioned; and the output 121 of the flip-flop circuit 120 goes high. In response to the line 92 going low, a flip-flop circuit 123 is operated which produces a low output to the input of a NAND gate 122 one clock pulse later. The NAND gate 122 passes a low output pulse on line 124 which starts the operation of the trailing half window detector logic 48.

The trailing or second half synchronization waveform detector logic 48 is in an initialized normal position where the output on line 125 is low and the output on line 126 is high. In response to the conducting of the NAND gate 122, which indicates that the criteria is good, as previously mentioned, a counter arrangement 107 will commence counting a predetermined number of clock pulses. In the event that such predetermined count of the clock pulses should reach the limit prior to the next operation or indication that the criteria is good, the output 125 goes high for purposes hereinafter described.

Because the output line 121 of the flip-flop circuit 120 is low prior to the transition or first criteria good indication on the line 114, a NAND gate 132 is unable to conduct to operate the flip-flop 130 to indicate a valid synchronization waveform has occurred.

During the second half of the synchronization waveform, the digital samples of such waveform are compared and detected by the detectors 25 and 30 in the same manner as described for the first half of the synchronization waveform. When the criteria is met simultaneously for the second half of such pulse, the line 114 again provides another output indicating criteria good which operates the flip-flop circuit 120 so that the line 121 is again low and the line 92 is high. At this time, the conditions for the NAND gate 132 are satisfied and the flip-flop circuit 130 is operated to produce a high on the output 131, indicating that a valid synchronization waveform has occurred. In the event that the criteria good indication is missing prior to the counting of a predetermined number of clocked pulses by the counter of 48, the output on line 133 to the input of a NAND gate 134 goes high; and if the flip-flop 120 has not yet been operated by the criteria good indication on the line 114, the line 121 is high, and the gate 134 conducts, which provides a low output on the line 95 to prevent a criteria good indication from occurring as previously described. The line 95 is input to the NAND gate 96 of the consecutive miss detector 32 and a similar NAND gate for the detector 30 to prevent an output from occurring on either the line 34 or the line 35 which is required in order to meet the criteria. Thus, during the first half of a synchronization waveform, any noise sufficient to prevent the criteria from being met merely prevents the simultaneous outputs from either the detectors 22 and 32 or 25 and 30, respectively. However, once the criteria good has been established, and the counter of the logic 48 begins counting, a certain time interval corresponding to 21 counts plus any delays in the circuit resulting from normal operation of the components, is provided for the next criteria good indication to arrive to provide an output on the valid synchronization line 131, so that the data detection can commence.

It will be recalled, that the data detection portion of the system is confined to the shortest pulse duration of seven counts, for example. Thus, during such alternate code forms, the greatest number of clocked pulses during the data portion of the cycle that can occur without a transition is 14, which would satisfy the synchronization k of N detectors 22 and 25; but, there could not be eighteen consecutive pulses that would satisfy the miss detector criteria. Therefore, the synchronization waveform portion of the system would merely detect the incoming pulses as they occurred, but a criteria good indication could never be reached to provide a valid synchronization waveform output.

Figure 3A:
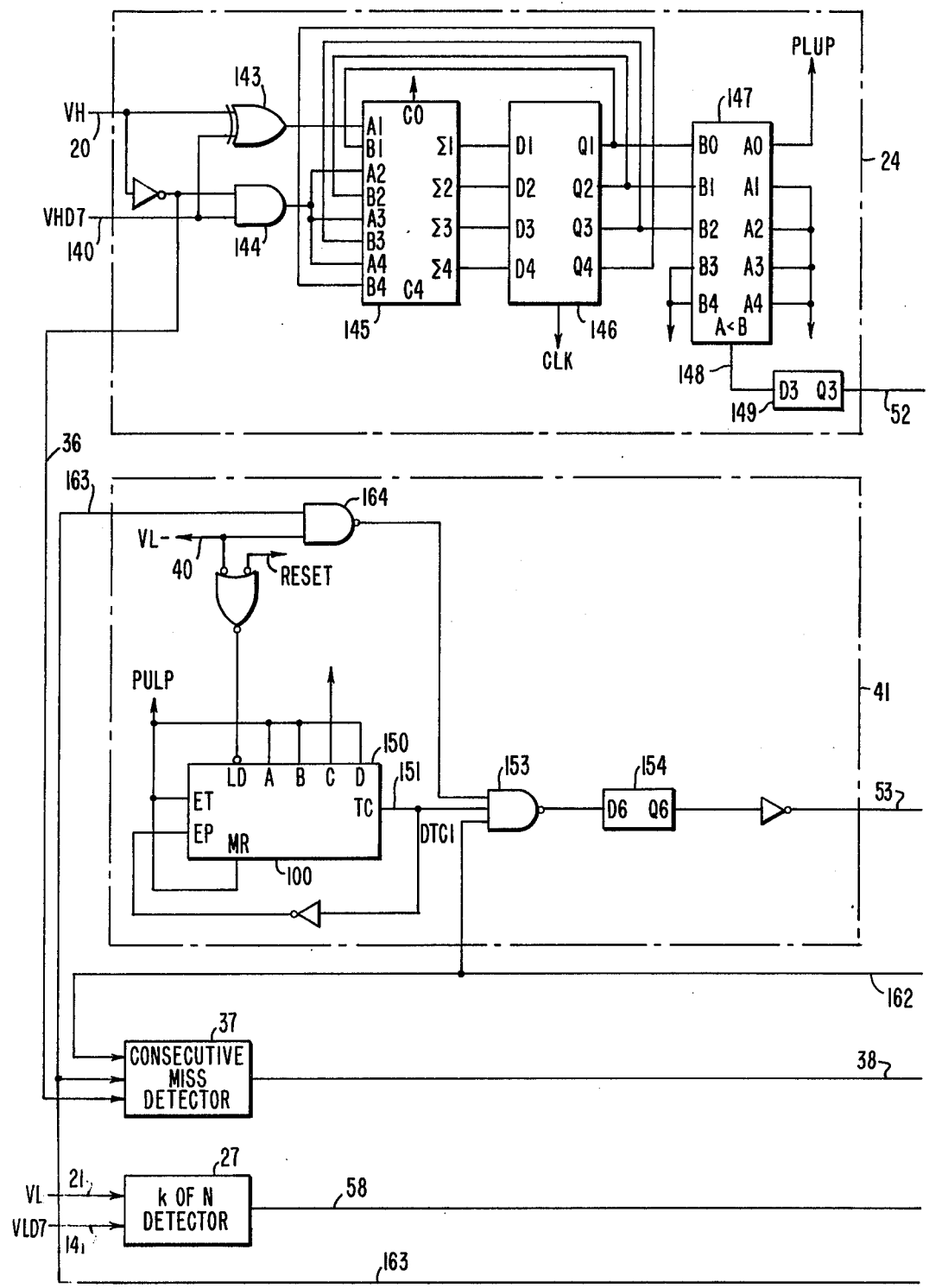
FIGS. 3A, 3B, and 3C are schematic diagrams to illustrate in more detail that portion of the system of FIG. 1 for validating the data bit waveforms.
Figure 3B:
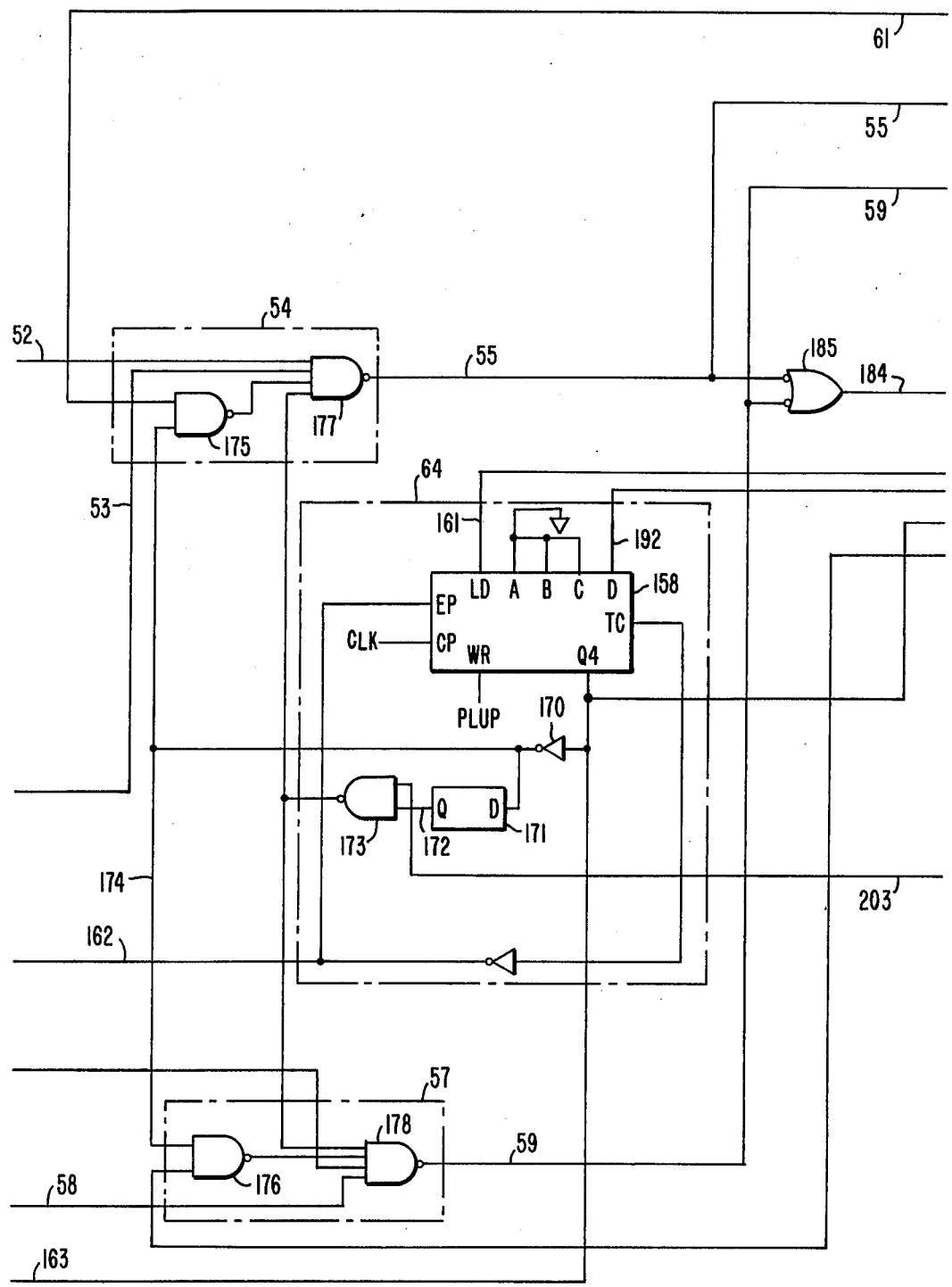

Referring to FIGS. 3A and 3B, the individual detectors and logic circuits in the data detection portion of the system are enclosed by dashed lines and have reference numerals similar to the reference numerals of the block diagram of FIG. 1. Also, the inputs to FIGS. 3A and 3B which are also included in the description of FIG. 1 have similar reference characters for ease of understanding. The k′ of N′ detectors 24 and 27 are constructed similar to the previously described detectors 22 and 25 of FIG. 1; and the j' of N' consecutive miss detectors 41 and 37 are similar to the miss detectors 30 and 32 of FIG. 2A. However, the detectors 24 and 27 provide for the counting of seven clocked pulses during each half of a data pulse; and the consecutive miss detectors 41 and 47 provide for detecting four consecutive pulses for each half of a data pulse or waveform. With respect to the k' of N' detector 24, the delay line of the detector 22 (FIG. 2) is omitted and a portion of the delay line 72 is utilized by tapping such line to delay a total of seven pulses at output 140 (see FIG. 2); and the other k' of N' detector 25 is tapped at 141 for delaying a total of seven clock pulses. The detector 24 has its input 20 connected to the output of the digital sampler 17 to respond to each of the pulses that are detected above the +T threshold. An exclusive OR gate 143 and an AND gate 144 provide the input to a binary adder 145 which produces a running total of each of the clocked pulses, both delayed and current coming on input lines 140 and 20, respectively; and subtracts the oldest pulse and adds the most current pulse in a conventional manner. A flip-flop circuit 146 stores the output of the adder; and a digital comparator 147 provides an output on line 148 to operate a flip-flop circuit 149 to place a high on the line 52 as long as any three of the previous seven clocked pulses are detected as being above the +T threshold. Simultaneously, the j' consecutive miss detector 41 is receiving the clock pulses from the digital sampler 18 over the line 40. The detector 41 includes a counter 150 to provide an output on line 151 as long as the last four consecutive pulses are more positive than the negative threshold value. Should one of the previous four pulses be below this threshold value, the counter 150 is reset and the output on line 151 goes to a logical zero to start the process over. A NAND gate 153, which produces an output to operate a flip-flop circuit 154 for placing a high on the output line 53 when four consecutive clock pulses are less negative than the −T threshold value, will be described hereinafter.

Referring to the counter 64, which establishes the time reference points for the criteria of k' of N' and j' consecutive to be present, it is initially loaded when the valid synchronization output 131 (see FIG. 1) and the output 125 (see FIG. 1) indicate that a valid synchronization waveform has been completed by causing a NAND gate 156 to conduct and place 157 to a low level for one clock time. The line 157 in this condition initializes the data bit trailing half verification logic 60 to load a counter 158 of the data bit window counter 64 by way of AND gate 160 and line 161. When the counter 158 starts counting, a line 162 goes high which enables the NAND gate 153 to detect the count of the consecutive pulses for operating the flip-flop circuit 154 to provide an output on the line 53 when the consecutive miss criteria is met. The initial loading of the counter 158 differs from the continuous loading which occurs upon the detection of a mid-portion of each data bit, as described hereinafter. The most significant bit D is loaded differently, depending upon where the loading comes from; that is, either the initial synchronization or as generated by each of the data bits. Thus, after synchronization, and the counter is loaded, an output occurs almost immediately on line 163 from the counter 158 because a transition point must be looked for sooner immediately after a synchronization waveform. The output on the line 163 either causes a NAND gate 164 or a similar NAND gate in the j' miss detector 37 to conduct to provide an output on either line 53 or 38 after detecting four consecutive pulses, either less positive than +T threshold or more positive the −T threshold immediately after a transition or dropout of the four consecutive criteria and before the end of the synchronization period. Subsequent to such transition, a longer count can occur because such count is going to be made from one transition point to the next. Such transition points are referred to as M in FIG. 7.

The criteria on lines 52 and 53 are input to the high state detector logic 54 while the criteria on the output lines 38 and 58 are input to the low state detector logic 57.

During the first half of each data pulse, the output 163 from Q4 of the counter 158 is high which operates an inverter 170, which operates a flip-flop circuit 171 to provide a low level one clock pulse later at its output 172 which is input to a NAND gate 173. Also, during the first half of each data pulse, line 174 is low which is input to NAND gate 175 of the high state detector 54 and NAND gate 176 of the low state detector 57. During the first half of each data pulse, the output of Q4 conditions the circuit to look for the transition point.

For a valid first half of each data pulse, either the k' of N and the j' straight on lines 52 and 53, or the k' of N' and the j' straight on lines 38 and 58 criteria have been met. Thus, if such data pulse is a positive pulse, all of the inputs to a NAND gate 177 are high which produces a low output on the line 55 if a logical "one" is present; or, all of the inputs to a NAND gate 178 of the detector 57 are high during the first half of each negative pulse if the criteria has been met to generate a low on the output 59. Thus, for a properly detected pulse, the output on either 55 or 59 is low when all of the criteria have been met during the first half of each data pulse.

The lines 55 and 59 are input to a flip-flop circuit 180 provided with a combination AND and NAND gate inputs 181 and 182. Either the input gate 181 or the input gate 182 will operate the flip-flop 180 to either detect a high output on the line 61 or a high or low output on a line 183 indicating the polarity of the first half of the data bit. However, this does not occur until a criteria good indication has been determined over input 184 from the output of NAND gate 185. The NAND gate, of course, indicates that either a high or a low data pulse is present. The output on terminal Q4 of the counter 158 of course is high during the first half of the data pulse and provides the third input to the gates 181 and 182. If a "one" is detected in response to the operation of the flip-flop circuit 180, the output of the NAND gate 175 goes low and is prevented from generating an output during the second half of such data pulse. Similarly, if a low data pulse is detected, the output 183 to the input of the NAND gate 176 causes its output to go low to prevent a valid output on the line 59 during the second half of the data pulse.

The mid-bit transition is detected each time a criteria good indication is detected on the line 84 at the output of the NAND gate 185. This operates a flip-flop circuit 187 to place its output 188 high. The operation of the flip-flop 187 to this condition causes a NAND gate 190 to conduct low, which in turn causes an AND gate 191 to conduct low for loading the counter 158 over the line 161. This loading of the counter at the transition point of each data pulse is different than the loading of the counter at the end of the synchronization waveform. At this point it has been loaded over the line 161 rather than being loaded by the action of line 157 from the synchronization waveform detector. With this loading, the output line 163 from the terminal Q4 of the counter 158 will remain low for a period of eight clock pulses. Thus, at every transition point, the counter 158 is reloaded, and after eight pulses which is at least one pulse into the second half of each data pulse, the line 163 connected to the terminal Q4 goes high, which permits the outputs of the detectors to indicate compliance with the previously described criteria for either a "one" or a "zero" data pulse.

As previously mentioned, the mid-bit output 188 is initially a zero before it has been clocked; thus, the data bit trailing half verification logic 62 is disabled over line 200, which prevents AND gate 201 from conducting to keep flip-flop 202 in a state such that the output line 63 is low. When the mid-bit output 188 goes high at the first transition point, as previously described, the gate 201 conducts to operate the flip-flop 202 to cause the data valid output 63 to go high. When the data valid line 63 goes high, an input 203 to the gate 173 goes high which results in disabling any further criteria from causing toggling of the flip-flops 187 and 202.

Therefore, keeping in mind that the duration of each half data pulse is seven clock pulses, a count of greater than eight on the counter 158, which commences at each mid-bit, insures that the line 163 from the terminal Q4 will always go high at a time when the first half of each data pulse should occur. If a transition point should not occur, then a data valid indication on the line 63 does not occur. The occurrence of such transition point is dependent upon a criteria good indication at the output of the exclusive NAND gate 185. Thus, each data bit synchronizes the subsequent data bit at the mid-bit position. While the Q4 terminal is high, during the first half of each data bit, it goes low at each transition point and provides a window that extends slightly beyond the beginning of the next data bit and requires that a criteria of opposite polarity must be established prior to the counting of the eight clock pulses or prior to the line 63 at the terminal Q4 from going high.

The operation of the system will now be summarized and described in connection with the timing diagrams of FIGS. 6 and 7. Each of the timing waveforms bears reference numerals similar to the output lines of the components that operate in accordance with such waveforms.

Figure 3C:
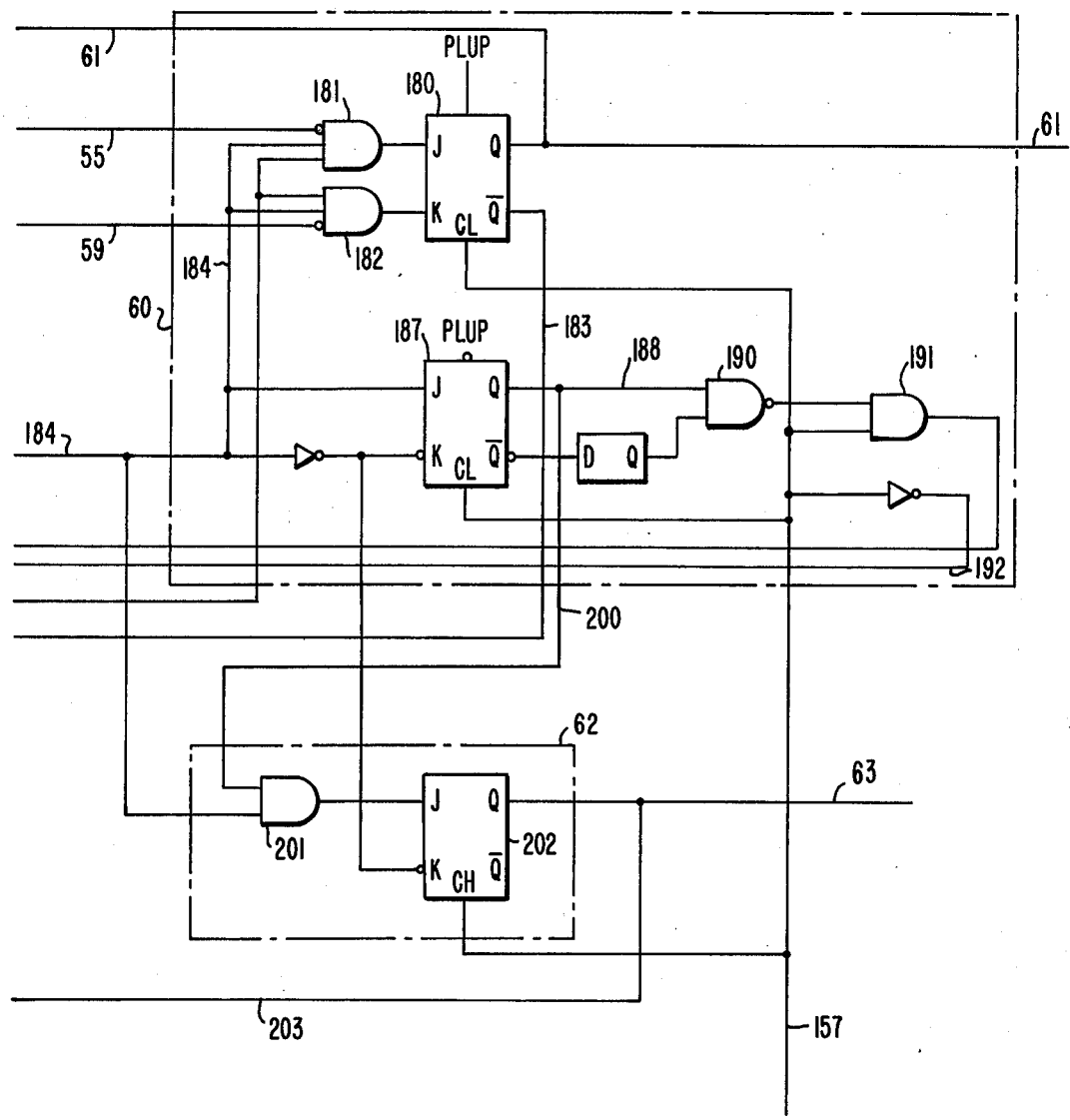
Figure 6:
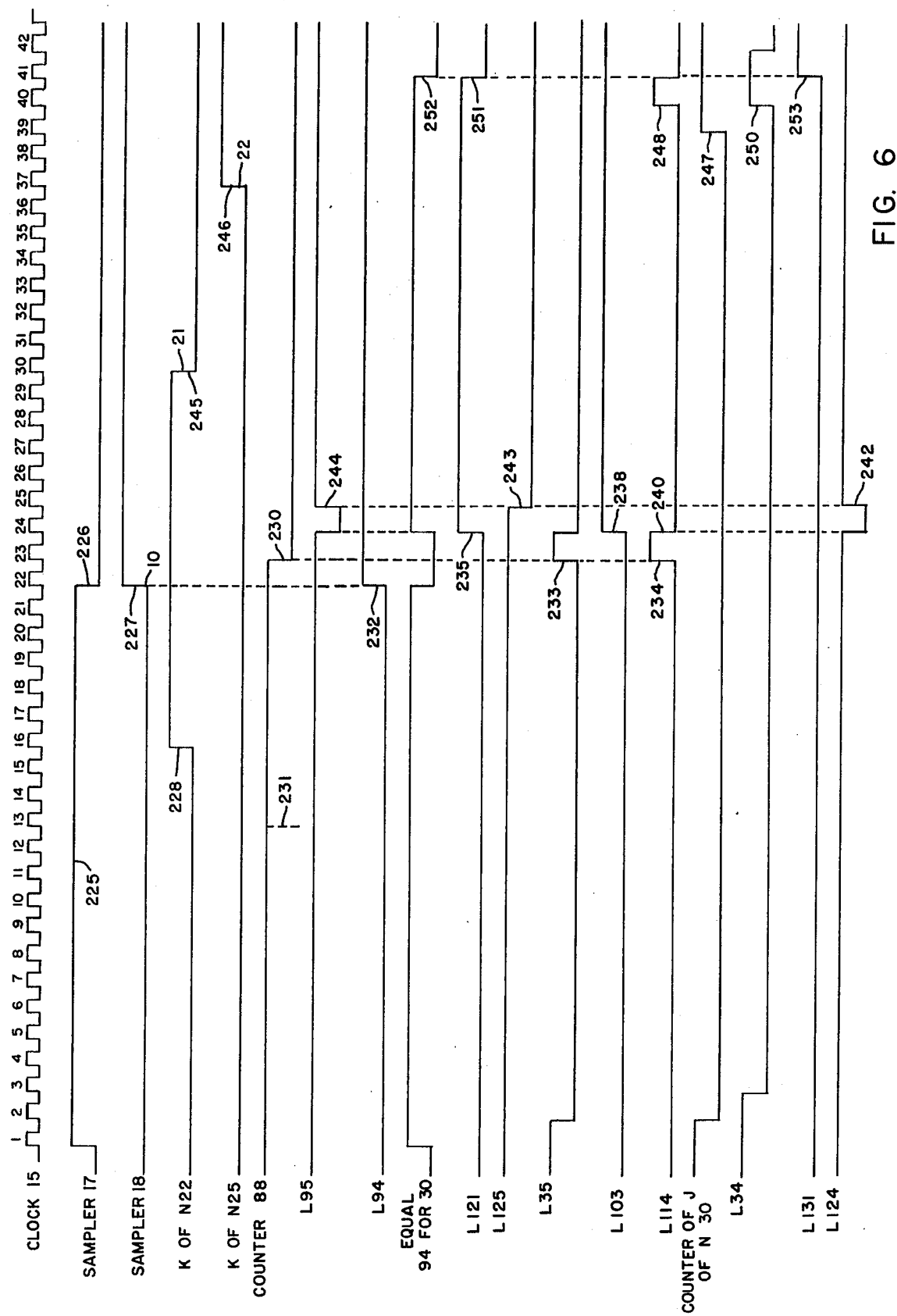
FIG. 6 is a timing diagram of the operation of the synchronization portion of the system.

Referring to FIG. 6, a timing diagram showing the operation of the synchronization waveform detection portion of the system will now be described in connection with a typical operation of the system. Each of the individual waveforms is identified, either by the block diagram of FIGS. 1 and 2 or with respect to the condition of a particular line output or input from such blocks with the same reference character preceded by an L. When the system is initially turned on, all of the components are placed in an initialized condition by the application of a voltage at a terminal identified as reset in FIGS. 2 and 3. A clock 15 waveform of FIG. 3 indicates the clocked pulses which occur at a 14 megahertz rate in accordance with the described embodiment.

Assuming that a synchronization waveform is transmitted from the transmitter 10, the first half of which is a high or positive waveform of 3 microseconds, a high output occurs at the output of the sampler 17 for a period of 21 clock pulses as shown by portion 225 of the sampler 17 waveform. Because such output is a high, the waveform identified as sampler 18 remains low during the occurrence of the 21 clock pulses. At the beginning of the 22nd clock pulse, where the synchronization waveform reverses polarity, the sampler 17 waveform goes low at point 226 while the sampler 18 waveform goes high at 227. After the sampling of fourteen pulses, the output of the k of N detector 22 goes high at 228, for example, indicating that at least 14 of the previously transmitted twenty-one pulses were detected by the digital sampler as being above the +T threshold level. The point 228 of course could occur for a valid synchronization waveform at any point after the occurrence of the fourteenth clock pulse and up to the occurrence of the 21 clock pulse to obtain a valid first half synchronization waveform. During this time, the k of N detector 25 waveform remains low. The output of the counter 88 waveform in the j consecutive miss detector 32 which is controlled by the sampler 18 output remains high during the first half of the synchronization waveform as long as the digital samples are detected as being less negative than the −T threshold level. In the present example, it is assumed that all of the digital samples are above such level and such waveform does not go low until it reaches position 230. If one or more of the digital samples were detected as being below the −T threshold, as could be caused by noise, for example, the line referred to as counter 88 could go low at a location identified by dashed line 231, which would invalidate the detection of the first half of the synchronization waveform. When the sampler 18 line goes high at 227, the line L94 goes high at 232, and together with counter 88 being high at this time produces a pulse of one clock period duration, one clock period later to appear on line 35. This pulse on L35 at time 233 causes the pulse at 234 in L114 indicating a criteria good condition.

When the line L121 goes high at 235, this causes L124 to go low for one clock period at 241 and this resets the counter 127 of the synchronizing transition detector logic 48. In response to the pulse on line L114 at 234, the line L103 goes high at 238 which causes the next half criteria to be of opposite polarity. When line L124 goes high at 242, the line L125 goes low at 243 which starts the counting of the clock 127 of the synchronous trailing half window counter. This counter commences counting at a 14 megahertz rate and provides a window from the beginning of such count up to a predetermined number beyond 21 to account for any delays in the circuitry, such as 23, for example, for the criteria good to become established within that window time period. It is noted that the line L125 cannot go low until the line 121 goes high at 235. Also, the line L125 going low at 243 results in the line L95 going high at 244 to permit the j consecutive miss detector 32 to commence counting.

During the second half of the synchronization period, when the sampler 18 goes high at 227, the line k of N 22 drops out at 245 indicating that less than 14 of the previously transmitted digital samples have not been above the +T threshold level. The line k of N 25 goes high at 246 indicating that at least fourteen of the previously transmitted pulses have been below the −T threshold level to meet one of the criteria for the second half of the waveform. Also, the counter in the j′ of N′ 30 consecutive miss detector goes high at 247 indicating that at least 18 consecutive digital samples have been detected as being less negative than the −T threshold level which completes the criteria for a valid synchronization waveform. Thus, at 248 the line L114 goes high to indicate that the criteria has been met in response to the line L34 going high at 250. In response to the L114 going high at 248, the line L121 goes low at 251 and line 131 goes high indicating a valid synchronization waveform. The complement of L131 or L110 goes low and causes the line corresponding to the line L94 of the detector 32 to go low at 252; this causes L114 to drop and prohibit any extraneous toggling of flip-flop 120 in synchronous transition detector logic 44.

Referring to FIG. 7, a timing diagram is shown for the data code portion of the waveform with the individual timing lines being referenced with a correspondingly numbered line of FIGS. 1 or 3A and 3B or by the output of a function block as appropriate. The fourteen megahertz clock is represented by the appropriately referenced waveform as in the description of FIG. 6. For the purposes of illustration, three data bit codes are represented by the diagram; but it is understood that more than three data bits may be utilized for a complete digital word. In the present example, it is assumed that the first data bit is a "zero", the second data bit is a "zero", and the the third data bit is a "one".

Each data bit in the present embodiment is one microsecond duration, which is equivalent to seven digital samples of the 14 megahertz clock. The end of the synchronization waveform and the beginning and ends of each of the three data bits are so legended in FIG. 3b. The mid-bit positions of each of the data bits are referred to as MB1, MB2, and MB3, respectively. After a valid synchronization has occurred, L125 goes high at 261. The line L125 going high at 261 also causes L157 to go low for one clock period at 260 for resetting the counter 158 by setting it to the most significant bit, as mentioned in connection with FIG. 3B to accommodate for the short mid-bit transition time accompanying the first data bit following synchronization. As noted by the line 162 going high at 262, the hardware design delays the detection capabilities for the first bit by approximately two clock pulses. Either the $j$ miss detector 37 or the $j'$ miss detector 41 can commence counting the digital samples once L162 has gone high, such as at 262, and L163 remains high.

Inasmuch as the first data bit is a "zero", the output of the sampler 18 is high, and the output of the sampler 17 is low. Thus, the line L58 is high in that it has been continually detecting at least three out of said seven digital samples as being below the $-T$ threshold level. The line for the equivalent of the counter 100 in the miss detector 37, is high in that it has been counting digital samples that were below the $-T$ threshold for a period of time prior to the first data bit. Thus, both criteria, that is, three of seven have been detected as being below the $-T$ threshold, and at least four of the digital samples have been detected as being consecutively less than the $+T$ threshold. At the mid-bit position MB1 of the first half of the data pulse, the incoming code goes high at 263 and the output of the sampler 17 goes low at 264. One clock pulse after this occurrence, the counter 100 commences counting at the point represented by dashed line 265. Simultaneously, the equivalent counter for the detector 37 reloads at 266.

In response to the changing of the code pulse from low to high at 263 and high to low at 264, the line L164 goes low at 267 and the line for the equivalent of the gate 164 for the $j'$ miss detector 37 goes high at 268. One clock pulse later L38 goes high at 270, which causes L59 to go low at 271, which indicates that there had been a "zero" for the first half of the code. In turn, L184 goes high at 272 which indicates the criteria is good at the mid-bit position for the first half of the first data bit.

At the beginning of the next clock pulse, L61 remains low indicating a "zero" data bit polarity and L161 goes low at 273 in response to 188 going high at 278; and L162 goes low at 274. L38 goes low at 275 in response to the line equivalent to the counter 100 line in 37 going low at the previous clock pulse. The criteria good waveform L184 goes low at 276 in response to the line L53 going low at 275. The line L190 goes low at 277 in response to L188 going high at 278, which resets the counter at 274 of line L162, which provides the mid-bit reference. Upon the reloading of the counter, L163 goes low at 280; and L164 goes high at 281 which conditions the $j'$ miss detector 41 to generate an output upon the counting of four consecutive miss samples above the lower threshold voltage $-T$.

During the second half of the first data bit, the line L52 goes high at 285 indicating that at least three of out seven of the previous pulses have been detected above the $+T$ threshold level and L58 goes low at 286 after it has ceased to detect at least three out of seven digital samples below the $-T$ threshold level. At 287 the counter 100 output goes high indicating that there have been at least four consecutive digital samples above the $-T$ threshold level. The line L53 goes high at 287 indicating that there have been four consecutive digital samples above the $-T$ threshold level. The dropping out of the line L55 at 288, which was caused by the presence of L52 and L53, results in the line L184 going high at 289 indicating that the criteria of $j'$ of $N'$ consecutive samples and $k'$ of $N'$ have been met. When the line L84 goes high at 289, the line L188 goes low at 290, and line L63 goes high at 291, indicating that the first complete data bit is valid. When line 63 goes high at 291 line 173 goes low at 282, counter 158 is loaded by L161, and one clock pulse after, L163 goes high at 293 or 310, for example. While L173 is low between 282 and 292 after the validation of the complete first data pulse, the detectors L52 and L58 merely follow the code coming in from the comparators 11 and 12 through the digital samples.

When the counter 158 reaches a count of 8, L163 goes high at 293 and L173 goes high at 292. While line L163 is high, it defines a window within which the next mid-bit transition is permitted to occur without invalidation of the data pulse. Because the data bit 2 is a "zero", the sampler 17 goes low at 294 and the sampler 18 goes high at 295 simultaneously. At this point, L52 is high and L58 is low indicating that at least three out of the previous seven clock pulses have been detected above the threshold level, but three out of seven of the previous clock pulses have not been detected below the low or $-T$ threshold level. After a delay of one pulse into the first half of the second data bit, the counter 100 goes low at 296 and stops counting. Simultaneously, the equivalent counter for the $j'$ miss detector 37 commences counting at a point indicated by dashed line 297. At point 298 the counter for the detector 37 indicates that there have been at least four digital samples below the $+T$ threshold level. Also, L58 goes high at 299 indicating that at least three of the seven previous digital samples have been below the $-T$ threshold level. The $+T$ threshold detector causes L52 to drop at 300. When it has been determined that at least four consecutive have been below the $+T$ threshold and a dropout which occurs at 301 of the equivalent counter 100 for detector 37 line, caused by the transition of sampler 17 at 312, the equivalent of line 164 for detector 37 goes high at 302 indicating that there has been a transition from low to high of sampler 17 at 312. This causes a one clock duration pulse to appear on line 38. In response thereto, L59 goes low at 303 indicating that the second data bit is a "zero" and L184 goes high at 304 indicating that the criteria is good for the first half of the second data pulse. In response to the criteria good indication, L188 goes high at 305 which causes L190 to go low at 306 and load counter 158, and L63 goes low at 307 which drops out the data valid indication in preparation for the second half of the second data bit and L61 remains low indicating a "zero" data bit polarity. Also, it is noted that the counter 158 was loaded at 310 and the line L163 in effect closed the window for validating the first half of the second data bit.

During the second half of data bit 2, the sampler 17 line goes high at 312 and sampler 18 goes low at 313. The k' of N' is satisfied at 314 of L52 and the counter 100 has indicated that at least four consecutive pulses have been sampled above the −T threshold at 315 of the line L53 which causes L55 to go low at 316 and L184 to go high at 317 indicating that the criteria is good for the second half of the second pulse. The occurrence of the criteria good on the line L184 causes L188 to go low at 318, and L63 to go high at 319 to indicate a data valid condition for the complete second data bit. L63 going high at 319 causes L173 to go low at 308.

Inasmuch as the third data pulse is a "one", there is no change in the operation of either the k' of N' detectors or the j' of N' detectors; but after a predetermined count, the line L163 goes high at 320 to provide a window or time frame during which the transition point or mid-bit of the third data bit must occur. During such time frame, the comparator 11 goes low at 321 and the comparator 12 goes high at 322 and the same operation is repeated as was described in connection with the transition point MB2 for data bit 2.

It is understood that various modifications in the circuit arrangement will occur to a person skilled in the art, once the present invention is taught. It is also understood that the system and method of the present invention can be used to advantage with coded waveforms that are uni-polar, or with coded waveforms that are sine-waves, triangular waves, etc.

We claim:

1. A receiver for detecting transmitted coded waveforms that are characterized by at least first and second distinct energy levels, said receiver comprising,
    means for comparing the first and second energy levels of the coded waveform with an associated first and second threshold level respectively,
    means to sample the output of the means for comparing at a predetermined frequency to obtain a plurality of samples of each of the energy levels,
    first detection means to generate a first distinctive output in response to the detection of a predetermined number of samples of the plurality of samples of each of the first and second energy levels which at least are as great as their associated threshold level,
    second detection means to generate a second distinctive output in response to the detection of a predetermined consecutive number of samples of each of the first and second energy levels which are less than the threshold level associated with the other energy level,
    and means governed by the distinctive outputs of the first and second detection means to validate the occurrence of each of the distinct energy levels.

2. A receiver according to claim 1 wherein the first and second energy levels are of a positive and negative voltage respectively, and the first and second threshold levels are of a predetermined positive and negative voltage respectively.

3. A receiver according to claim 1 wherein the coded waveform is a Manchester Code.

4. A receiver according to claim 1 wherein the coded waveform is comprised of substantially square wave pulses.

5. A receiver according to claim 1 wherein a portion of the coded waveform corresponds to the transmission of distinct data bits, and said receiver further comprises,
    third detection means to detect the transition of the waveform between the first and second energy levels,
    fourth means governed by the third means to generate a third distinctive output during a predetermined time interval subsequent to each detected transition, and a second validity means governed by the first, second, and third distinctive outputs to validate each transmitted data bit only prior to the expiration of said time interval.

6. A receiver according to claim 5 wherein the third detection means generates the third distinctive output intermediate the beginning and end of the data waveform for each data bit, and the second validating means operates in response to the distinctive outputs to validate the immediate preceding complete data bit waveform.

7. A method of detecting transmitted coded waveforms to minimize the effect of electrical noise, said waveform being characterized by at least first and second distinct energy levels, said method comprising,
    comparing each transmitted energy level with an associated first and second respective threshold level,
    sampling each distinct energy level a predetermined number of times,
    detecting the energy level of each sample relative to both said threshold levels,
    validating the first distinct energy level pulse at times when a predetermined portion of the samples of such level at least is as great as its associated first threshold level and a predetermined consecutive number of the samples is less than the second energy level, and
    validating the second distinct energy level pulse at times when a predetermined portion of the samples of such level at least is as great as its associated second threshold level and a predetermined consecutive number of the samples is less than the first energy level.

8. A method according to claim 7 wherein a portion of the coded waveform corresponds to the transmission of distinct data bits, said method further comprising the steps of
    detecting the transition of the waveform between the first and second energy levels, and
    validating each data bit within a predetermined time interval subsequent to the detection of each transition.

9. A method according to claim 7 wherein the first and second energy levels are of a positive and negative voltage respectively, and the first and second threshold levels are of a predetermined positive and negative voltage respectively.

10. A method according to claim 9 wherein the coded waveform is a Manchester Code.

* * * * *